United States Patent [19]
Ohtsuka et al.

[11] Patent Number: 5,446,750
[45] Date of Patent: Aug. 29, 1995

[54] LASER DIODE PUMPED SOLID LASER

[75] Inventors: Hisashi Ohtsuka; Yoji Okazaki; Hiroaki Hyuga; Shinji Mitsumoto, all of Kanagawa, Japan

[73] Assignee: Fuji Photo Film Co., Ltd., Kanagawa, Japan

[21] Appl. No.: 323,883

[22] Filed: Oct. 17, 1994

[30] Foreign Application Priority Data

Nov. 12, 1993 [JP] Japan .................................. 5-283123

[51] Int. Cl.⁶ ............................................. H01S 3/04
[52] U.S. Cl. ......................................... 372/34; 372/22; 372/36
[58] Field of Search ............................. 372/34, 22, 36

[56] References Cited

U.S. PATENT DOCUMENTS

| | | | |
|---|---|---|---|
| 5,181,214 | 1/1993 | Berger et al. | 372/34 |
| 5,187,714 | 2/1993 | Okazaki et al. | 372/36 |
| 5,253,102 | 10/1993 | Okazaki | 372/22 |
| 5,303,250 | 4/1994 | Masuda et al. | 372/22 |
| 5,341,388 | 8/1994 | Masuda et al. | 372/34 |
| 5,383,209 | 1/1995 | Hwang | 372/22 |

*Primary Examiner*—Leon Scott, Jr.
*Attorney, Agent, or Firm*—Sughrue, Mion, Zinn, Macpeak & Seas

[57] ABSTRACT

A laser diode pumped solid laser comprises an optical module comprising a laser diode, a solid laser crystal, which is excited by a laser beam produced by the laser diode, and a resonator. An electronic cooling device has a cooling surface, on which the optical module is placed, and a heat radiating surface. An inner case housing houses the optical module therein on the cooling surface of the electronic cooling device. An outer case housing houses the inner case housing and the electronic cooling device therein and supports the electronic cooling device via its heat radiating surface. A temperature sensor detects the temperature in the region inside of the inner case housing. A control circuit controls the electronic cooling device in accordance with an output of the temperature sensor and thereby keeps the temperature in the region inside of the inner case housing at a predetermined target value.

5 Claims, 2 Drawing Sheets

LASER DIODE PUMPED SOLID LASER

BACKGROUND OF THE INVENTION

1. Field of the Invention

This invention relates to a laser diode pumped solid laser. This invention particularly relates to a laser diode pumped solid laser having an improved structure for the adjustment of the temperature of an optical module.

2. Description of the Prior Art

Laser diode pumped solid lasers have been proposed in, for example, U.S. Patent Nos. 4,656,635. The proposed laser diode pumped solid lasers comprise a solid laser medium, to which a rare earth metal, such as neodymium (Nd), has been added. The solid laser medium is pumped by a semiconductor laser (a laser diode). In the laser diode pumped solid laser of this type, in order for a laser beam having as short a wavelength as possible to be obtained, a crystal of a nonlinear optical material for converting the wavelength of a solid laser beam, which has been obtained from solid laser oscillation, is located in a resonator of the solid laser. The solid laser beam is thereby converted into its second harmonic, or the like.

In cases where such a laser diode pumped solid laser is used, the temperature of an optical module, which comprises a laser diode, a solid laser crystal, and a resonator, is ordinarily adjusted at a predetermined temperature such that the output power of the laser diode, which serves as a pumping source, and the wavelength of the laser beam, which is produced by the laser diode, can be prevented from fluctuating. In cases where the crystal of a nonlinear optical material for converting the wavelength of the produced solid laser beam is located in the resonator, the temperature of the optical module is ordinarily adjusted at a predetermined temperature such that a predetermined phase matching state can be kept in the nonlinear optical crystal. The adjustment of the temperature is ordinarily carried out by placing the optical module on a cooling surface of an electronic cooling device (or a Peltier device), detecting the temperature at a position in the vicinity of the laser diode or the nonlinear optical crystal, and controlling the electronic cooling device in accordance with the detected temperature.

In the laser diode pumped solid laser described above, as in the other various laser apparatuses, for the purposes of protection of the optical module and heat insulation from the exterior, the optical module is housed in a single case housing, and a laser beam is taken out through a beam take-out window, which is formed in a wall of the case housing. The case housing has heretofore been constructed such that the optical module and the electronic cooling device may together be housed in the case housing, and such that a heat radiating surface of the electronic cooling device may be supported by the case housing.

However, with the conventional laser diode pumped solid laser, in which both the optical module and the electronic cooling device are housed in a single case housing, the accuracy, with which the temperature is adjusted, cannot be kept sufficiently high, and the temperature in the region inside of the case housing is apt to fluctuate. If the temperature in the region inside of the case housing fluctuates, the output power of the laser diode, which serves as the pumping source, and the wavelength of the laser beam, which is produced by the laser diode, will fluctuate. As a result, the output power and the wavelength of the solid laser beam, which is obtained from solid laser oscillation, will fluctuate.

Also, if the temperature in the region inside of the case housing fluctuates, the optical parts housed in the case housing will move due to thermal expansion and contraction, or the temperature of the nonlinear optical crystal, which is employed in order to convert the wavelength of the produced solid laser beam, will fluctuate. As a result, the predetermined phase matching state cannot be obtained. In such cases, the output power of the beam will fluctuate, and the quality of the beam will become bad.

SUMMARY OF THE INVENTION

The primary object of the present invention is to provide a laser diode pumped solid laser, wherein the accuracy, with which the temperature in the region inside of a case housing that houses an optical module therein is adjusted, is kept sufficiently high, and the output power and the wavelength of a produced beam are thereby prevented from fluctuating.

Another object of the present invention is to provide a laser diode pumped solid laser, which yields a beam having good quality.

The present invention provides a laser diode pumped solid laser comprising:
  i) an optical module comprising a laser diode, a solid laser crystal, which is excited by a laser beam produced by the laser diode, and a resonator,
  ii) an electronic cooling device having a cooling surface, on which the optical module is placed, and a heat radiating surface,
  iii) an inner case housing, which houses the optical module therein on the cooling surface of the electronic cooling device,
  iv) an outer case housing, which houses the inner case housing and the electronic cooling device therein, and which supports the electronic cooling device via its heat radiating surface,
  v) a temperature sensor for detecting the temperature in the region inside of the inner case housing, and
  vi) a control circuit, which controls the electronic cooling device in accordance with an output of the temperature sensor and thereby keeps the temperature in the region inside of the inner case housing at a predetermined target value.

Research carried out by the inventors revealed that, with the conventional laser diode pumped solid laser, the accuracy, with which the temperature in the region inside of a case housing that houses an optical module therein is adjusted, cannot be kept sufficiently high for the reasons described below. Specifically, in the conventional laser diode pumped solid laser, the heat radiating surface of an electronic cooling device is in contact with a single case housing, which houses an optical module therein. Therefore, heat radiation from the electronic cooling device is effected through the case housing. Accordingly, the temperature of the case housing itself and the temperature in the region inside of the case housing are apt to fluctuate.

In the laser diode pumped solid laser in accordance with the present invention, the outer case housing corresponds to the single case housing of the aforesaid conventional laser diode pumped solid laser. Therefore, with the laser diode pumped solid laser in accordance with the present invention, heat radiation from the electronic cooling device is effected through the outer case housing. Accordingly, as in the conventional laser diode pumped solid laser, the temperature of the outer case housing itself and the temperature in the region inside of the outer case housing will fluctuate. However, with the laser diode pumped solid laser in accordance with the present invention, the inner case housing is located in the region inside of the outer case housing, and the optical module is accommodated in the inner case housing. Therefore, the optical module suffers from little effect of the fluctuation in the temperature of the outer case housing itself and the temperature in the region inside of the outer case housing. Accordingly, the accuracy, with which the temperature in the region inside of the inner case housing that houses the optical module therein is adjusted, can be kept sufficiently high.

The inner case housing is not located on the heat radiating surface of the electronic cooling device, but is located on the cooling surface of the electronic cooling device. Therefore, heat radiation from the electronic cooling device is not effected via the inner case housing. Accordingly, the temperature of the inner case housing itself does not fluctuate directly due to the heat radiation from the electronic cooling device.

Also, with the laser diode pumped solid laser in accordance with the present invention, the electronic cooling device is controlled in accordance with the detected temperature in the region inside of the inner case housing. In this manner, the temperature of the optical module housed in the inner case housing can be kept accurately at the target value. Accordingly, with the laser diode pumped solid laser in accordance with the present invention, the output power and the wavelength of a produced beam can be prevented from fluctuating, and a beam having good quality can be obtained.

DESCRIPTION OF THE PREFERRED EMBODIMENTS

The present invention will hereinbelow be described in further detail with reference to the accompanying drawings.

Figure 1:
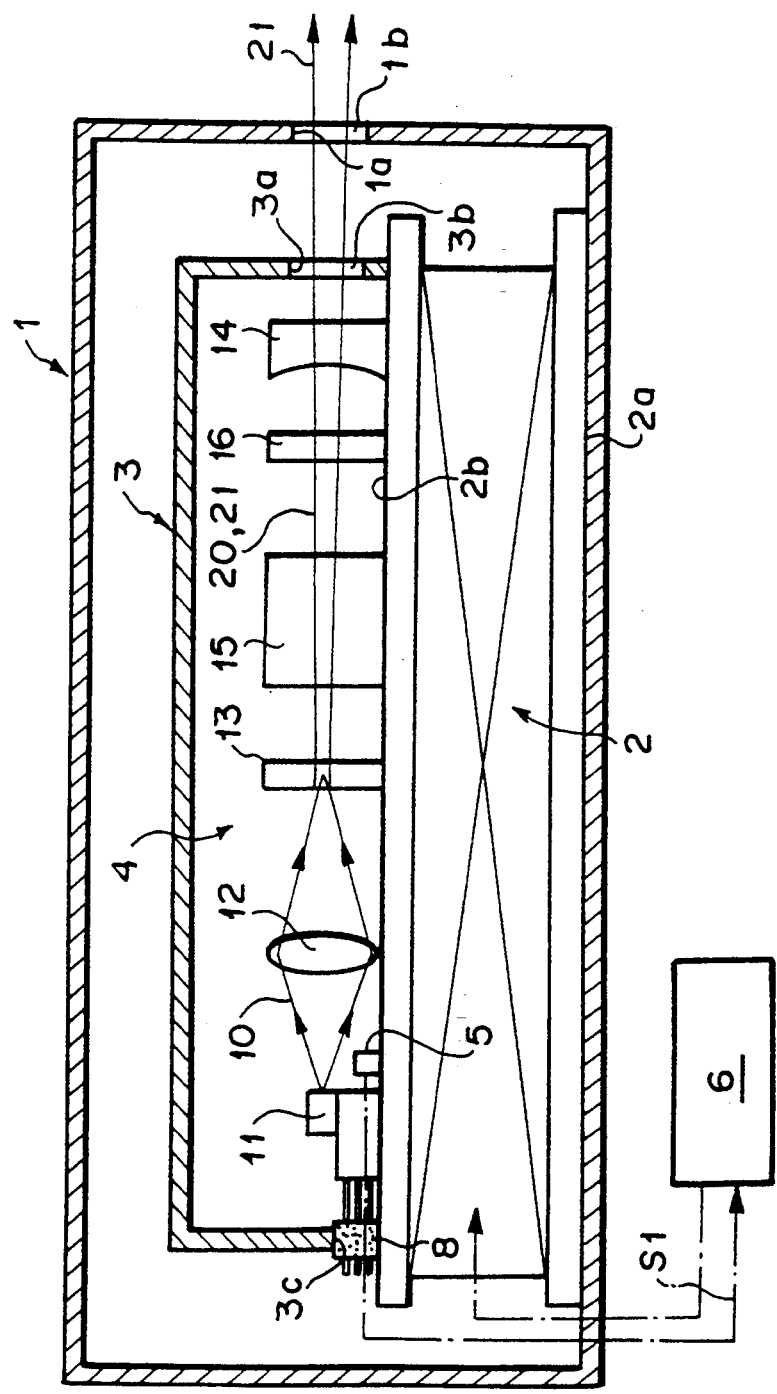
FIG. 1 is a partially cutaway side view showing an embodiment of the laser diode pumped solid laser in accordance with the present invention.

FIG. 1 shows an embodiment of the laser diode pumped solid laser in accordance with the present invention. The laser diode pumped solid laser comprises an outer case housing 1 and an electronic cooling device (a Peltier device) 2, which is located in the outer case housing 1 and has a heat radiating surface 2a supported by the outer case housing 1. The laser diode pumped solid laser also comprises an inner case housing 3, which is located in the outer case housing 1 and secured to a cooling surface 2b of the electronic cooling device 2, and an optical module 4, which is housed in the inner case housing 3. The laser diode pumped solid laser further comprises a temperature sensor 5, which detects the temperature in the region inside of the inner case housing 3, and a control circuit 6, which controls the electronic cooling device 2 in accordance with the output of the temperature sensor 5.

How the optical module 4 is constructed will be described hereinbelow. The optical module 4 is provided with a semiconductor laser (a phased array laser) 11, which produces a laser beam 10 serving as a pumping beam, and a condensing lens 12, which condenses the laser beam 10 having been produced as divergent light. The laser diode pumped solid laser is also provided with a YAG crystal 13, which is a solid laser medium doped with neodymium (Nd). The YAG crystal 13 doped with neodymium (Nd) will hereinafter be referred to as the Nd:YAG crystal 13. The laser diode pumped solid laser is further provided with a resonator mirror 14, which is located on the side downstream (i.e. the right side in FIG. 1) from the Nd:YAG crystal 13. A crystal 15 of $KNbO_3$, which serves as a nonlinear optical material, is located between the Nd:YAG crystal 13 and the resonator mirror 14. (The crystal 15 of $KNbO_3$ will hereinbelow be referred to as the KN crystal 15.) Also, an etalon 16 is located between the KN crystal 15 and the resonator mirror 14.

The semiconductor laser 11 produces the laser beam 10 having a wavelength of 809 nm. The Nd:YAG crystal 13 has an Nd concentration of 1 at % and a thickness of 1 mm. The neodymium atoms contained in the Nd:YAG crystal 13 are stimulated by the laser beam 10, and the Nd:YAG crystal 13 thereby produces a solid laser beam 20 having a wavelength of 946 nm. The solid laser beam 20 is brought by the etalon 16 to the single longitudinal mode and converted by the KN crystal 15, which serves as a nonlinear optical material, into its blue second harmonic 21 having a wavelength of 473 nm, which is one half of the wavelength of the solid laser beam 20. The second harmonic 21 passes through the resonator mirror 14, which is provided with an appropriate coating, and is radiated to the exterior of the laser diode pumped solid laser through a beam take-out window 3a of the inner case housing 3 and a beam take-out window 1a of the outer case housing 1.

Figure 2:
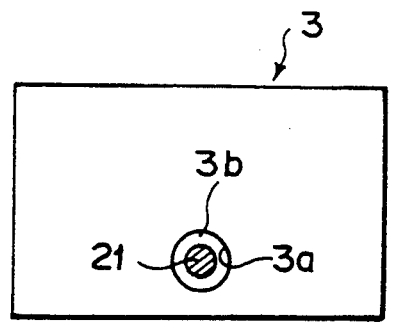
FIG. 2 is a front view showing part of the embodiment of FIG. 1.

As illustrated in FIG. 2, a glass plate 3b provided with a coating, which shows no reflection with respect to the second harmonic 21, is fitted to the beam take-out window 3a of the inner case housing 3 such that the heat insulation effects of the inner case housing 3 may not be lost. Also, a similar glass plate 1b is fitted to the beam take-out window 1a of the outer case housing 1.

How the temperature in the region inside of the inner case housing 3 is adjusted will be described hereinbelow. In the region inside of the inner case housing 3, the temperature sensor 5 detects the temperature at the position in the vicinity of the semiconductor laser 11, which generates heat. The temperature sensor 5 generates a temperature detection signal S1 and feeds it into the control circuit 6. The control circuit 6 controls the electronic cooling device 2 in accordance with the temperature detection signal S1 such that the temperature in the region inside of the inner case housing 3, i.e. the temperature around the optical module 4, can be kept at a target value.

When the electronic cooling device 2 is operated, heat is radiated from the heat radiating surface 2a. The heat is radiated through the outer case housing 1, which is in contact with the heat radiating surface 2a. Therefore, the temperature of the outer case housing 1 itself and the temperature in the region inside of the outer case housing 1 fluctuate. However, the optical module 4 is housed in the inner case housing 3, which is accommodated in the outer case housing 1. Therefore, the optical module 4 suffers from little effect of the fluctuation in the temperature of the outer case housing 1 itself and the temperature in the region inside of the outer case housing 1. Accordingly, the temperature of the semiconductor laser 11 and the temperature of the temperature sensor 5 can be accurately kept at a predetermined value. Also, the temperature of the optical module 4 is double insulated by the outer case housing 1 and the inner case housing 3 from the environmental temperature outside of the outer case housing 1, and therefore the optical module 4 suffers from little effect of the fluctuation in the environmental temperature. This feature also contributes to the enhancement of the accuracy, with which the temperature of the optical module 4 is adjusted.

With this embodiment, in cases where the environmental temperature fluctuates, the accuracy, with which the temperature of the optical module 4 is adjusted, (i.e. the difference between the temperature of the optical module 4 and the target value) could be kept at a value falling within the range of ±0.01° C. On the other hand, with a laser diode pumped solid laser for comparison, which was constructed in the same manner as that in the aforesaid embodiment, except that the inner case housing 3 was omitted as in the conventional laser diode pumped solid laser, the accuracy, with which the temperature of the optical module 4 is adjusted, was ±0.1° C. With a laser diode pumped solid laser, which was constructed in the same manner as that in the aforesaid embodiment, except that the Nd:YAG crystal 13 was replaced by an Nd:YVO$_4$ crystal and the KN crystal 15 was replaced by a KTP crystal, the accuracy, with which the temperature of the optical module 4 is adjusted, could be kept at a value falling within the range of ±0.01° C.

The elements of the optical module 4, such as the semiconductor laser 11 and the KN crystal 15, the temperatures of which should be adjusted with a particularly high accuracy, may be accommodated in a single-wall case housing or in a multi-wall case housing, which is housed in the inner case housing 3, such that the heat insulation effects can be still further enhanced.

Figure 3:
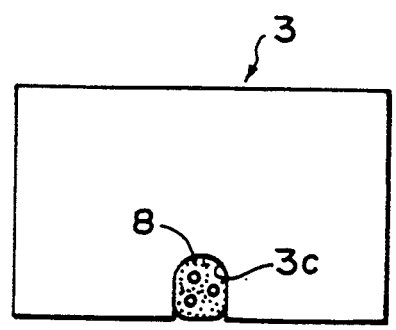
FIG. 3 is a front view showing a different part of the embodiment of FIG. 1.

As illustrated in FIG. 3, in order to enhance the heat insulation between the region inside of the inner case housing 3 and the region outside of the inner case housing 3, a lead terminal 8, which is electrically insulated from the main body of the inner case housing 3, may be fitted into a wiring window 3c of the inner case housing 3. The semiconductor laser 11 and the temperature sensor 5 are connected via the lead terminal to the external circuit. Alternatively, the lead terminal 8 being utilized, in cases where lead wires are inserted through the wiring window 3c without the lead terminal 8 being utilized, the size of the wiring window 3c should be set to be as small as possible.

What is claimed is:
1. A laser diode pumped solid laser comprising:
   i) an optical module comprising a laser diode, a solid laser crystal, which is excited by a laser beam produced by the laser diode, and a resonator,
   ii) an electronic cooling device having a cooling surface, on which the optical module is placed, and a heat radiating surface,
   iii) an inner case housing, which houses the optical module therein on the cooling surface of the electronic cooling device,
   iv) an outer case housing, which houses the inner case housing and the electronic cooling device therein, and which supports the electronic cooling device via its heat radiating surface,
   v) a temperature sensor for detecting the temperature in the region inside of the inner case housing, and
   vi) a control circuit, which controls the electronic cooling device in accordance with an output of the temperature sensor and thereby keeps the temperature in the region inside of the inner case housing at a predetermined target value.

2. A laser diode pumped solid laser as defined in claim 1 wherein a rare earth metal has been added to the solid laser crystal.

3. A laser diode pumped solid laser as defined in claim 2 wherein the rare earth metal is neodymium.

4. A laser diode pumped solid laser as defined in claim 1 further comprising a crystal of a nonlinear optical material for converting the wavelength of a solid laser beam, which has been produced by the solid laser crystal, the crystal of the nonlinear optical material being located in the resonator.

5. A laser diode pumped solid laser as defined in claim 4 wherein the solid laser beam is converted into its second harmonic.

* * * * *